US011958294B2

(12) United States Patent
Oya

(10) Patent No.: US 11,958,294 B2
(45) Date of Patent: Apr. 16, 2024

(54) CARTRIDGE

(71) Applicant: SEIKO EPSON CORPORATION, Tokyo (JP)

(72) Inventor: Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 17/840,741

(22) Filed: Jun. 15, 2022

(65) Prior Publication Data

US 2022/0402273 A1 Dec. 22, 2022

(30) Foreign Application Priority Data

Jun. 16, 2021 (JP) ................................. 2021-099846

(51) Int. Cl.
*B41J 2/175* (2006.01)

(52) U.S. Cl.
CPC ....... *B41J 2/17513* (2013.01); *B41J 2/17523* (2013.01); *B41J 2/17596* (2013.01)

(58) Field of Classification Search
CPC ................ B41J 2/17513; B41J 2/17523; B41J 2/17596; B41J 2/17509; B41J 2/1752; B41J 2/1753; B41J 2/17553; B41J 2/19; B41J 29/13; B41J 2/17503
USPC ........................................................... 347/86
See application file for complete search history.

(56) References Cited

U.S. PATENT DOCUMENTS 7,147,309 B2 12/2006 Sakai et al.
2002/0060725 A1* 5/2002 Shinada ............... B41J 2/17596 347/86

FOREIGN PATENT DOCUMENTS

JP 2006-062377 A 3/2006

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A cartridge includes: a liquid accommodating portion; a liquid supply portion having a central axis and a supply portion flow path which communicates with the liquid accommodating portion; and a valve mechanism arranged in supply portion flow path, wherein the valve mechanism has a valve seat having an insertion port into which liquid introduction portion is inserted, a valve body having a closing surface which abuts on the valve seat to close the insertion port, and a biasing member biasing valve body toward the valve seat, the valve mechanism is opened by the valve body being pushed by the liquid introduction portion, and the closing surface has a flat surface portion, and an inclined surface portion formed around the flat surface portion and inclined toward an edge of the closing surface, and at least a part of the inclined surface portion faces the introduction portion flow path in mounted state.

5 Claims, 8 Drawing Sheets

CARTRIDGE

The present application is based on, and claims priority from JP Application Serial Number 2021-099846, filed Jun. 16, 2021, the disclosure of which is hereby incorporated by reference herein in its entirety.

BACKGROUND

1. Technical Field

The present disclosure relates to a cartridge.

2. Related Art

In the related art, a configuration in which a cartridge to be mounted in a liquid ejecting apparatus includes a supply valve that opens/closes a liquid supply port communicating with a liquid accommodating chamber has been known (for example, JP-A-2006-62377). The supply valve is pushed by a liquid introduction portion of the liquid ejecting apparatus, and thus the supply valve is opened and the liquid accommodated in the liquid accommodating chamber is supplied to the liquid ejecting apparatus via the liquid introduction portion. The cartridge described in JP-A-2006-62377 further includes a breather valve, in which when the liquid is supplied to the liquid ejecting apparatus, air is taken in from the breather valve, and gas-liquid exchange is thus performed in the liquid accommodating chamber.

In the cartridge described in JP-A-2006-62377, the liquid is supplied from the liquid accommodating chamber through the liquid supply port, and the air for the gas-liquid exchange flows into the liquid accommodating chamber through the breather valve. Alternatively, a configuration in which both the liquid supply and the air inflow are performed through the liquid supply port is conceivable. In this configuration, when bubbles, which are inflow air, stay in a flow path for communicating the liquid supply port and the liquid accommodating chamber, the liquid supply may be interrupted.

SUMMARY

According to a first aspect of the present disclosure, there is provided a cartridge that is detachably mounted in a liquid ejecting apparatus including a liquid introduction portion with an introduction portion flow path. The cartridge includes: a liquid accommodating portion for accommodating a liquid; a liquid supply portion having a central axis and having a supply portion flow path which communicates with the liquid accommodating portion; and a valve mechanism arranged in the supply portion flow path, closed in an unmounted state in which the cartridge is not mounted in the liquid ejecting apparatus to bring the supply portion flow path into a non-communication state, and opened in a mounted state in which the cartridge is mounted in the liquid ejecting apparatus to bring the supply portion flow path into a communication state. The valve mechanism has a valve seat having an insertion port into which the liquid introduction portion is inserted, a valve body having a closing surface which abuts on the valve seat to close the insertion port and located upstream of the valve seat in a circulating direction of the liquid in the supply portion flow path when the liquid is supplied, and a biasing member biasing the valve body toward the valve seat. The valve mechanism is opened by the valve body being pushed by the liquid introduction portion and being separated from the valve seat. The closing surface has a flat surface portion, and an inclined surface portion formed around the flat surface portion and inclined toward an edge of the closing surface so that the edge is located upstream in the circulating direction, and at least a part of the inclined surface portion faces the introduction portion flow path in the mounted state.

DESCRIPTION OF EXEMPLARY EMBODIMENTS

A. Embodiment

A-1. Configuration of Printing System

Figure 1:
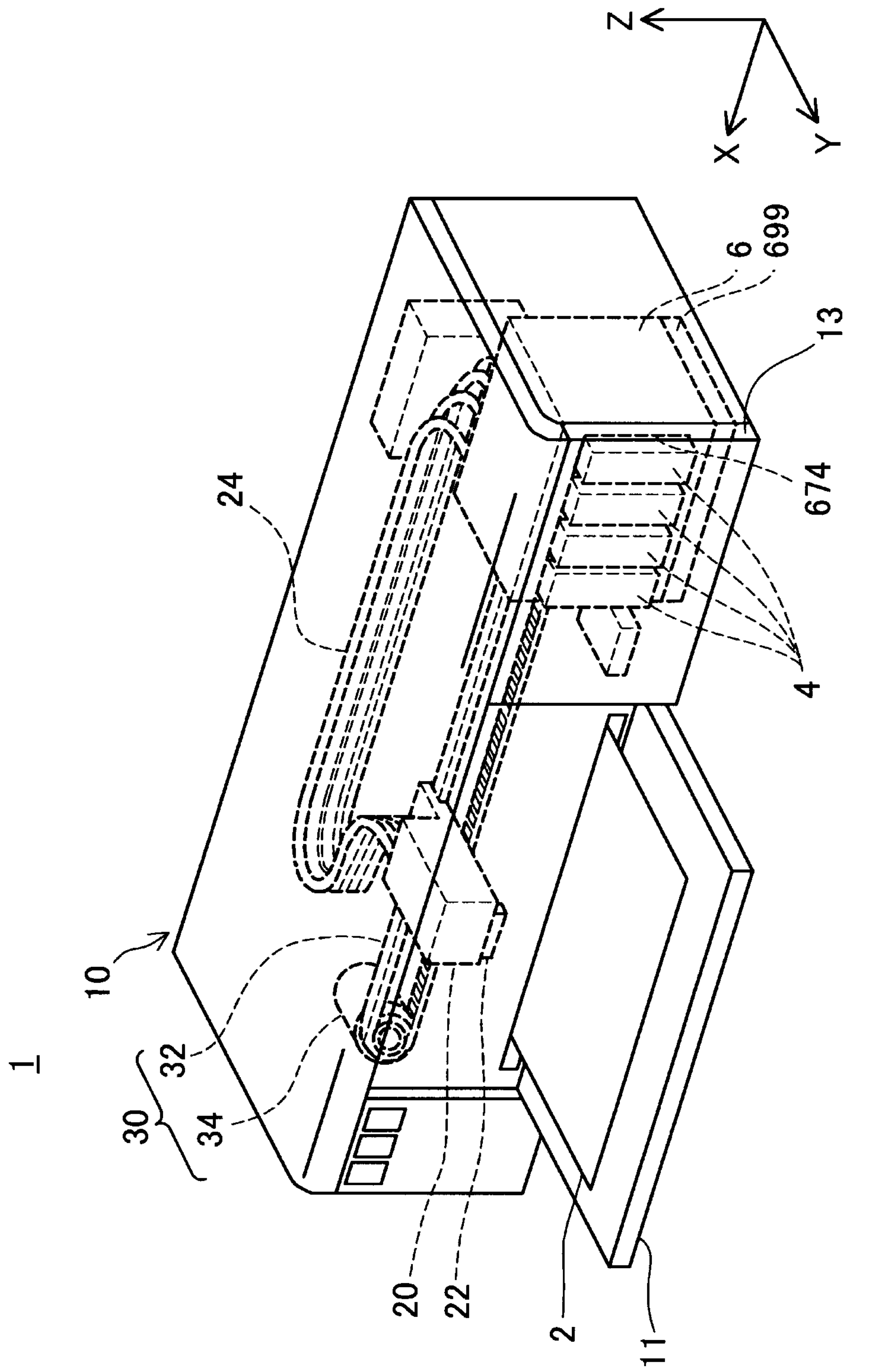
FIG. 1 is a perspective view illustrating a configuration of a printing system.

FIG. 1 is a perspective view illustrating a configuration of a printing system 1 as an embodiment of the present disclosure. In FIG. 1, X, Y, and Z axes, which are three orthogonal spatial axes, are drawn. The directions in which the arrows of the X axis, the Y axis, and the Z axis are directed represent positive directions along the X axis, the Y axis, and the Z axis, respectively. The positive directions along the X axis, the Y axis, and the Z axis are denoted by a +X direction, a +Y direction, and a +Z direction, respectively. The opposite directions of the directions in which the arrows of the X axis, the Y axis, and the Z axis are directed are negative directions along the X axis, the Y axis, and the Z axis, respectively. The negative directions along the X axis, the Y axis, and the Z axis are denoted by a −X direction, a −Y direction, and a −Z direction, respectively. Directions along the X axis, the Y axis, and the Z axis regardless of whether being positive or negative are called an X direction, a Y direction, and a Z direction, respectively. This applies similarly to the figures and descriptions to be described later.

The printing system 1 includes a printing apparatus 10 as a liquid ejecting apparatus, and a plurality of cartridges 4 supplying ink, which is a liquid, to the printing apparatus 10. The printing apparatus 10 in the present embodiment is an ink jet printer that discharges the ink, as a liquid, from a discharge head 22. The printing apparatus 10 is a large printer that performs printing on a large-sized sheet such as a poster. The printing apparatus 10 includes a cartridge mounting portion 6, a carriage 20, the discharge head 22, and a drive mechanism 30. The plurality of cartridges 4 which accommodate ink of colors different from each other are detachably mounted in the cartridge mounting portion 6.

The printing apparatus 10 has a replacement cover 13 on a front surface thereof in the +Y direction side. When the +Z direction side of the replacement cover 13 is tilted forward, that is, tilted toward the +Y direction side, an opening of the cartridge mounting portion 6 appears and the cartridge 4 can be mounted/detached. When the cartridge 4 is mounted in the cartridge mounting portion 6, the ink can be supplied to the discharge head 22 that is provided on the carriage 20 via a tube 24 as a liquid circulating tube. In the present embodiment, the ink is supplied from the cartridge 4 to the discharge head 22 with a head difference. Specifically, the ink is supplied to the discharge head 22 due to a head difference between a liquid level of the ink in a liquid storage portion 699 and the discharge head 22. In another embodiment, a pump mechanism (not illustrated) of the printing apparatus 10 may suck the ink in the cartridge 4 to supply the ink to the discharge head 22. The tube 24 is provided for each type of the ink. A state in which the cartridge 4 is mounted in the cartridge mounting portion 6 and the ink, as a liquid, can be supplied to the printing apparatus 10 is referred to as a "mounted state".

A nozzle for each type of ink is provided on the discharge head 22. The discharge head 22 discharges the ink from the nozzle toward a printing sheet 2 and print data such as characters or images on the printing sheet 2. The discharge head 22 is attached to the carriage 20. In the present embodiment, the printing apparatus 10 is a so-called "off-carriage type" printer in which the cartridge mounting portion 6 is not interlocked with the movement of the carriage 20. The present disclosure can also be applied to a so-called "on-carriage type" printer in which the cartridge mounting portion 6 is provided on the carriage 20 and the cartridge mounting portion 6 moves together with the carriage 20.

The drive mechanism 30 reciprocates, based on a control signal from the control portion, the carriage 20. The drive mechanism 30 includes a timing belt 32 and a drive motor 34. The carriage 20 reciprocates in a main scanning direction, which is a direction along the X direction, by transmitting power of the drive motor 34 to the carriage 20 via the timing belt 32. In addition, the printing apparatus 10 includes a transport mechanism for moving the printing sheet 2 in a sub-scanning direction which is the +Y direction. When printing is performed, the transport mechanism moves the printing sheet 2 in the sub-scanning direction, and the printed printing sheet 2 is output onto a front cover 11.

The cartridge 4 is detachably mounted in the printing apparatus 10. The cartridge 4 is inserted from an insertion/removal opening portion 674 of the cartridge mounting portion 6 in the −Y direction, and accommodated in the cartridge mounting portion 6.

In the present embodiment, in the use state of the printing system 1, an axis along the sub-scanning direction of transporting the printing sheet 2 is defined as the Y axis, an axis along the gravity direction is defined as the Z axis, and an axis along the movement direction of the carriage 20 is defined as the X axis. Here, "the use state of the printing system 1" refers to a state in which the printing system 1 is installed on a horizontal surface. In the present embodiment, the sub-scanning direction is defined as the +Y direction, a direction opposite to the +Y direction is referred to as the −Y direction, the gravity direction is defined as the −Z direction, and the antigravity direction is defined as the +Z direction. The X direction and the Y direction are directions along the horizontal direction. When the printing system 1 is viewed from a front side, a direction from the right side to the left side is defined as the +X direction, and a direction opposite to the +X direction is defined as the −X direction. In the present embodiment, an insertion direction in which the cartridge 4 is inserted into the cartridge mounting portion 6 for mounting is defined as the −Y direction, and a direction in which the cartridge 4 is removed from the cartridge mounting portion 6 is defined as the +Y direction. Thus, in the cartridge mounting portion 6, a −Y direction side is also referred to as a depth side, and a +Y direction side is also referred to as a front side. In the present embodiment, an arrangement direction of the plurality of cartridges 4 is defined as the X direction.

Figure 2:
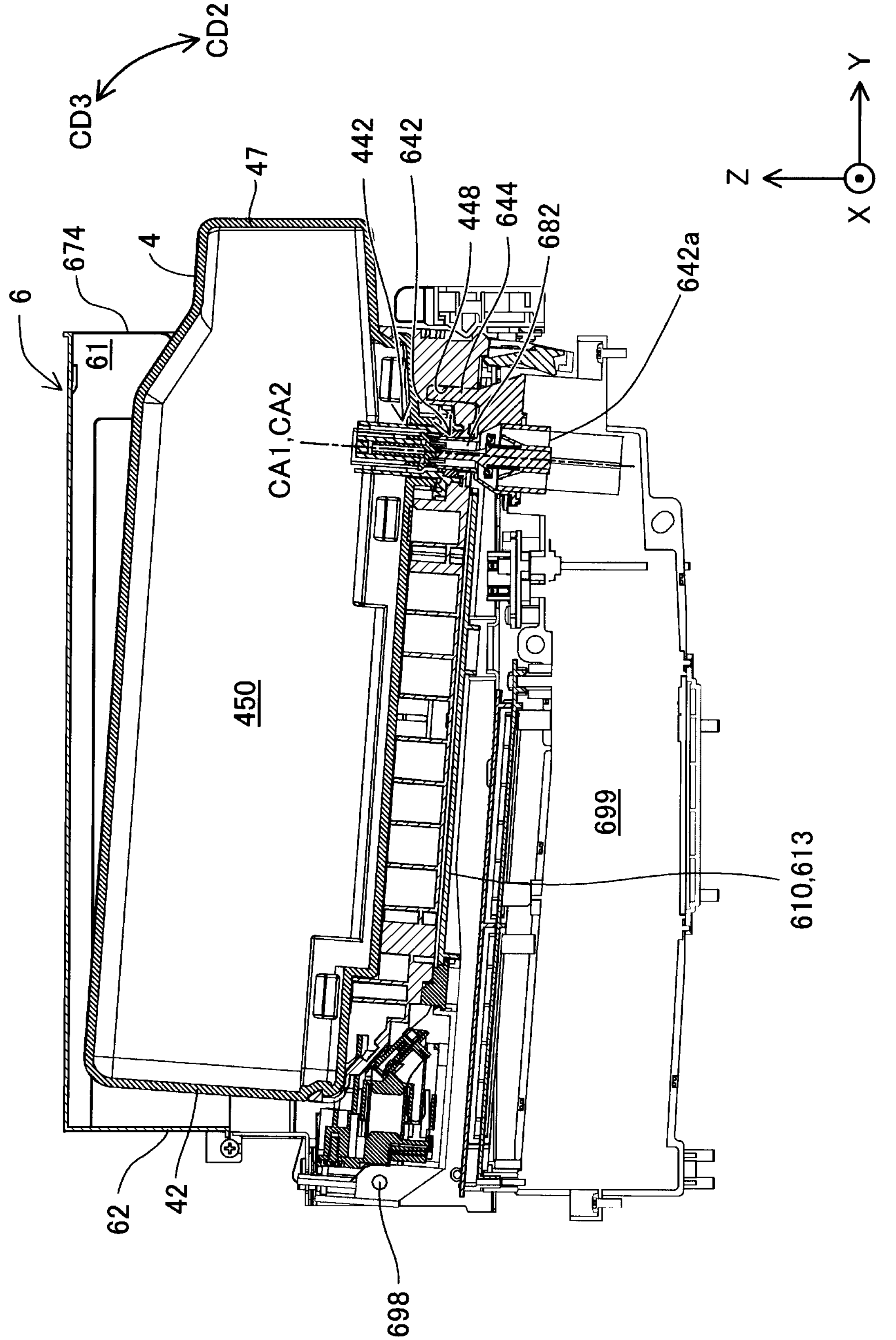
FIG. 2 is a sectional view of a cartridge in a mounted state.

A-2. Description of Cartridge Mounting Portion and Cartridge in Mounted State FIG. 2 is a sectional view of the cartridge 4 and the cartridge mounting portion 6 in the mounted state, taken along a YZ plane, as a cutting plane, that passes through a central axis of a liquid introduction portion 642. As illustrated in FIG. 2, the cartridge 4 is accommodated in an accommodating chamber 61 arranged at an upper portion of the cartridge mounting portion 6 in the mounted state.

The cartridge mounting portion 6 includes the liquid storage portion 699 arranged under the accommodating chamber 61, and the liquid introduction portion 642. The support member 610 forming a bottom wall of the accommodating chamber 61 supports the cartridge 4 from below. In the mounted state of the cartridge 4, a main wall 613 forming a bottom portion of the support member 610 is tilted with respect to the Y direction. Specifically, the main wall 613 of the support member 610 is tilted so as to be located on the −Z direction side, which is a lower side, toward the +Y direction side. The main wall 613 is in parallel to the Y direction in the initial arrangement state of the cartridge mounting portion 6 in which the cartridge 4 is not mounted.

The liquid storage portion 699 communicates with the discharge head 22 via the tube 24 illustrated in FIG. 1, and also communicates with the liquid introduction portion 642. The liquid storage portion 699 is formed with an atmospheric air inlet (not illustrated) in order to take in the atmosphere. The liquid introduction portion 642 is a cylindrical member, and has an introduction portion flow path 682 for allowing the liquid to circulate therein. A liquid supply portion 442 of the cartridge 4 is coupled to the liquid introduction portion 642 of the cartridge mounting portion 6 in the mounted state in which the cartridge 4 is mounted in the accommodating chamber 61 of the cartridge mounting portion 6.

In addition to the configuration, the cartridge mounting portion 6 has an apparatus-side supply portion positioning portion 644 used for positioning the cartridge 4. The apparatus-side supply portion positioning portion 644 has a substantially rectangular parallelepiped shape. The movement of the liquid supply portion 442 in a direction intersecting with a central axis CA2 of the liquid supply portion 442 is restricted by the apparatus-side supply portion positioning portion 644, which is a protrusion included in the cartridge mounting portion 6, entering into a supply portion positioning portion 448 having a recess shape and included in the cartridge 4. As a result, positioning of the liquid supply portion 442 to the liquid introduction portion 642 is performed.

The liquid supply portion 442 of the cartridge 4 is coupled to the liquid introduction portion 642 of the cartridge mounting portion 6 in the mounted state in which the cartridge 4 is mounted in the cartridge mounting portion 6. As a result, the ink accommodated in a liquid accommodating portion 450 of the cartridge 4 is supplied to the liquid introduction portion 642 via the liquid supply portion 442. In the present embodiment, while the ink is supplied from the liquid supply portion 442 to the liquid introduction portion 642, air accommodated in the liquid storage portion 699 forms bubbles, and the bubbles circulate in the liquid introduction portion 642, the liquid supply portion 442, and the liquid accommodating portion 450. As a result, gas-liquid exchange in the liquid accommodating portion 450 is performed.

A central axis CA1 of the liquid introduction portion 642 is in parallel with the central axis CA2 of the liquid supply portion 442 in the mounted state, and tilted with respect to the Z direction. In addition, a direction along the central axis CA2 of the liquid supply portion 442 is a direction along a direction in which the liquid supply portion 442 extends.

A-3. Description of Cartridge

Figure 3:
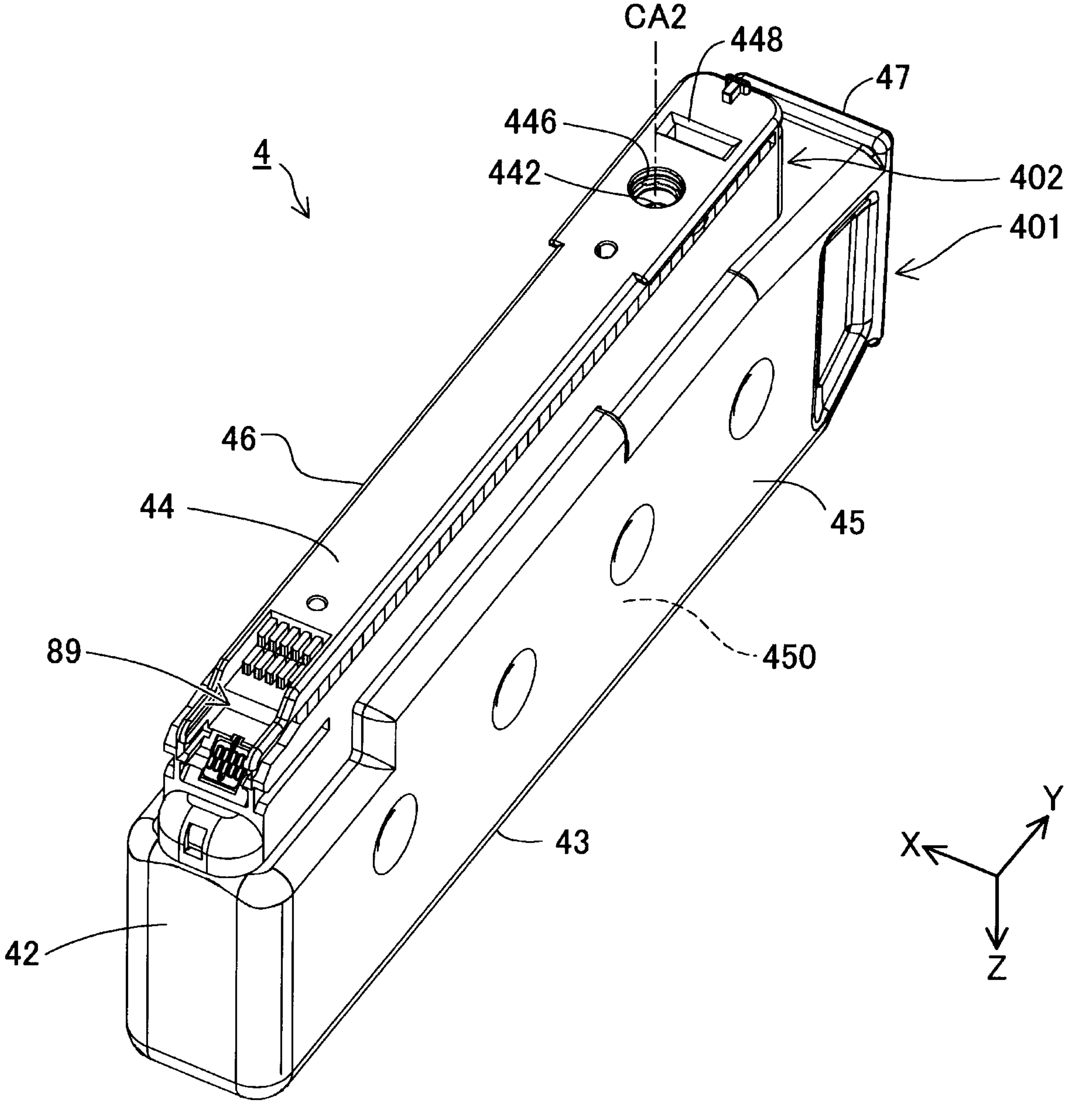
FIG. 3 is a perspective view of the cartridge.

FIG. 3 is a perspective view illustrating the cartridge 4. An appearance of the cartridge 4 has a substantially rectangular parallelepiped shape. In the cartridge 4, the Y direction is referred to as a depth direction, the Z direction is referred to as a height direction, and the X direction is referred to as a width direction. In the appearance of the cartridge 4, a dimension in the Y direction is the largest, and a dimension in the Z direction and a dimension in the X direction decrease in this order. The cartridge 4 includes a liquid accommodating body 401 and an adapter 402. The adapter 402 is attached to the liquid accommodating body 401 by engagement with the liquid accommodating body 401.

The cartridge 4 has a front wall 42, a rear wall 47, an upper wall 43, a bottom wall 44, a first side wall 45, a second side wall 46, and a corner portion 89. The front wall 42 and the rear wall 47 face each other in the Y direction. The upper wall 43 and the bottom wall 44 face each other in the Z direction. The Z direction is parallel with the central axis CA2 along the direction in which the liquid supply portion 442 extends. The first side wall 45 and the second side wall 46 face each other in the X direction. The upper wall 43 is located on the +Z direction side, and intersects with the front wall 42 and the rear wall 47. The bottom wall 44 is located on the −Z direction side, which is the gravity direction side in the mounted state. The bottom wall 44 intersects with the front wall 42 and the rear wall 47. The corner portion 89 is provided at a corner part where the front wall 42 intersects with the bottom wall 44.

The liquid accommodating body 401 has the liquid accommodating portion 450 and the liquid supply portion 442. The liquid accommodating portion 450, which is a space inside the liquid accommodating body 401, is provided for accommodating the liquid. The liquid supply portion 442 communicating with the liquid accommodating portion 450 is a cylindrical member protruding from the bottom wall 44 of the liquid accommodating body 401 to the adapter 402 side.

The adapter 402 includes a supply portion positioning portion 448 and an opening portion 446. The supply portion positioning portion 448 is a hole extending from the second side wall 46 toward the upper wall 43. The opening portion 446 is an opening formed in the bottom wall 44 in order to insert the liquid supply portion 442 therethrough. A positional relationship in which the opening portion 446 and the liquid supply portion 442 overlap is made, when the cartridge 4 is viewed from the bottom wall 44. In the present embodiment, the liquid supply portion 442 is arranged such that the central axis CA2 of the liquid supply portion 442 passes through the opening portion 446.

A-4. Description of Mounting Method of Cartridge

Figure 4:
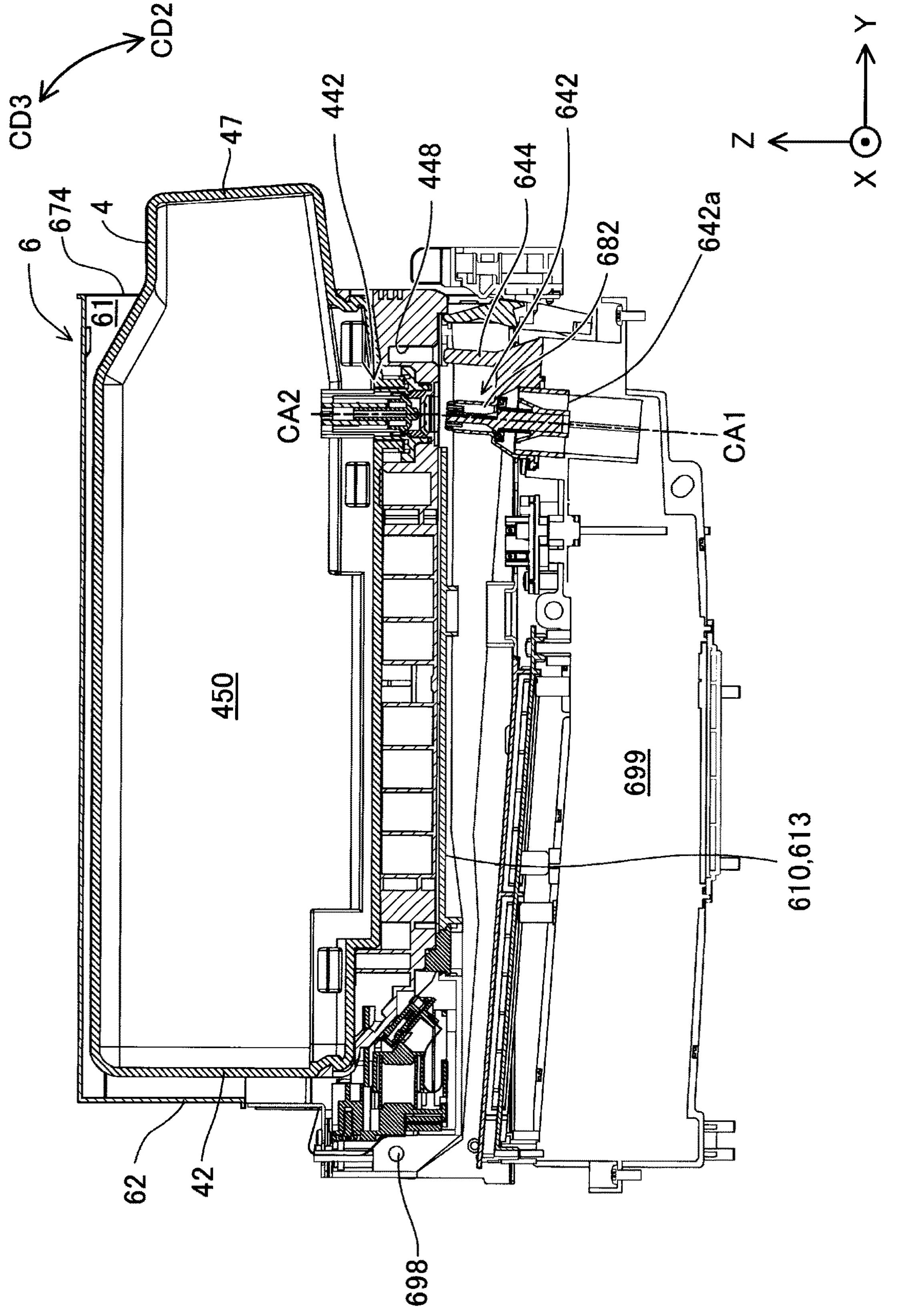
FIG. 4 is a view illustrating a cartridge mounting process.

FIG. 4 is a view illustrating a mounting process of the cartridge 4 in a cartridge mounting portion 6. When the cartridge 4 is mounted in the cartridge mounting portion 6, first, the cartridge 4 is inserted into the accommodating chamber 61 from the insertion/removal opening portion 674 of the cartridge mounting portion 6. As a result, the front wall 42 of the cartridge 4 is positioned as illustrated in FIG. 4. Next, the rear wall 47 side of the cartridge 4 is rotatably moved about a rotation fulcrum 698 in a coupling direction CD2 indicated by the arrow. Accordingly, the liquid supply portion 442 of the cartridge 4 is coupled to the liquid introduction portion 642 of the cartridge mounting portion 6. The rotation fulcrum 698 is provided on a second apparatus wall 62 side of the cartridge mounting portion 6. When the cartridge 4 is removed from the cartridge mounting portion 6, the above procedure is performed reversely. That is, the cartridge 4 is rotatably moved about the rotation fulcrum 698 in a coupling direction CD3 indicated by the arrow and then taken out from the accommodating chamber 61. As illustrated in FIG. 2, a state in which the liquid supply portion 442 of the cartridge 4 is coupled to the liquid introduction portion 642 of the cartridge mounting portion 6 is referred to as a mounted state. Conversely, as illustrated in FIG. 4 or the cartridge 4 alone, a state in which the liquid supply portion 442 of the cartridge 4 is not coupled to the liquid introduction portion 642 of the cartridge mounting portion 6 is referred to as an unmounted state. As illustrated in FIG. 4, a state in which the cartridge 4 is inserted into the accommodating chamber 61 is referred to as an inserted state.

A-5. Detailed Description of Cartridge Mounting Portion and Cartridge

Figure 5:
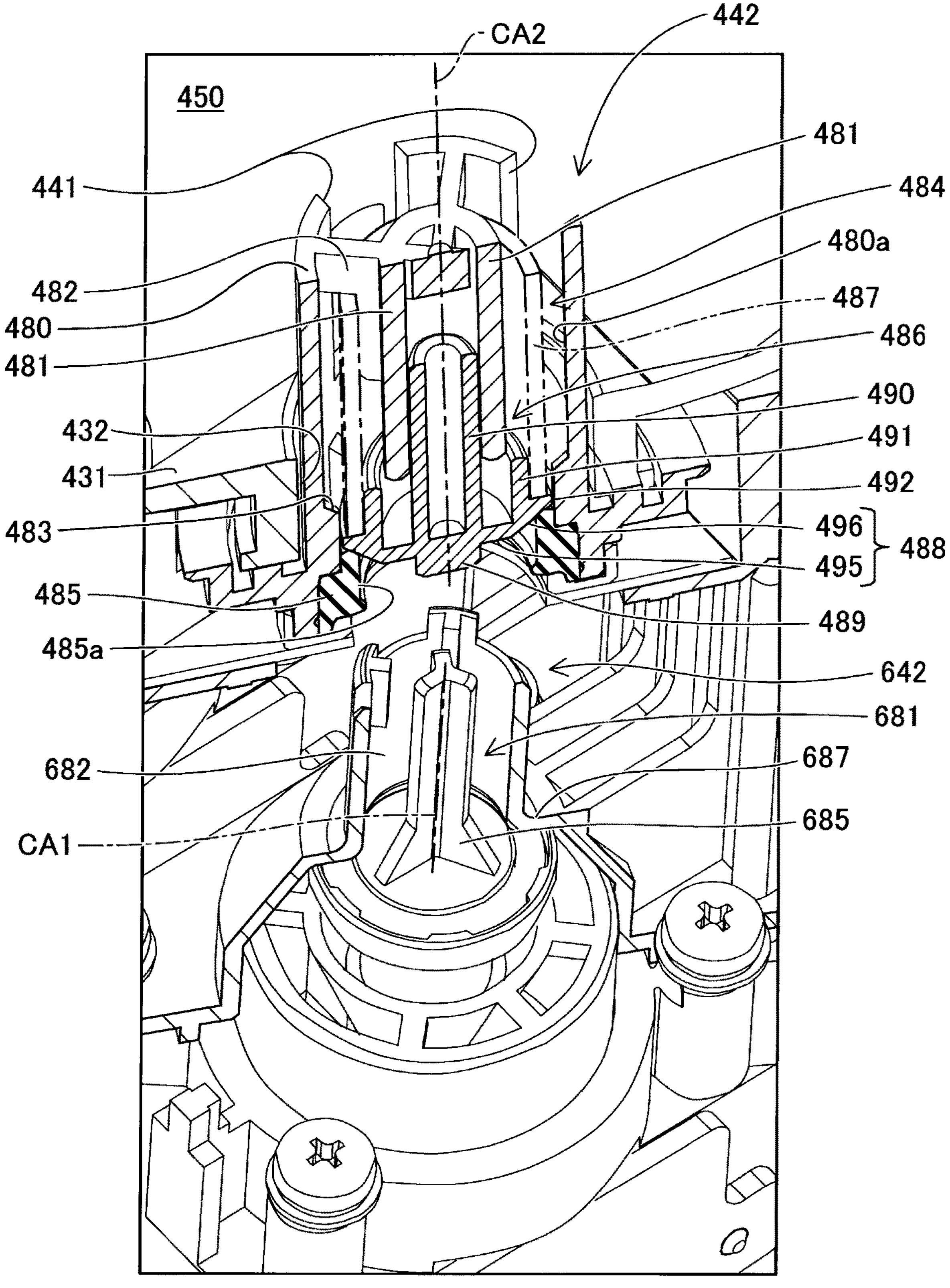
FIG. 5 is a perspective view of a liquid supply portion and a liquid introduction portion in an unmounted state.
Figure 6:
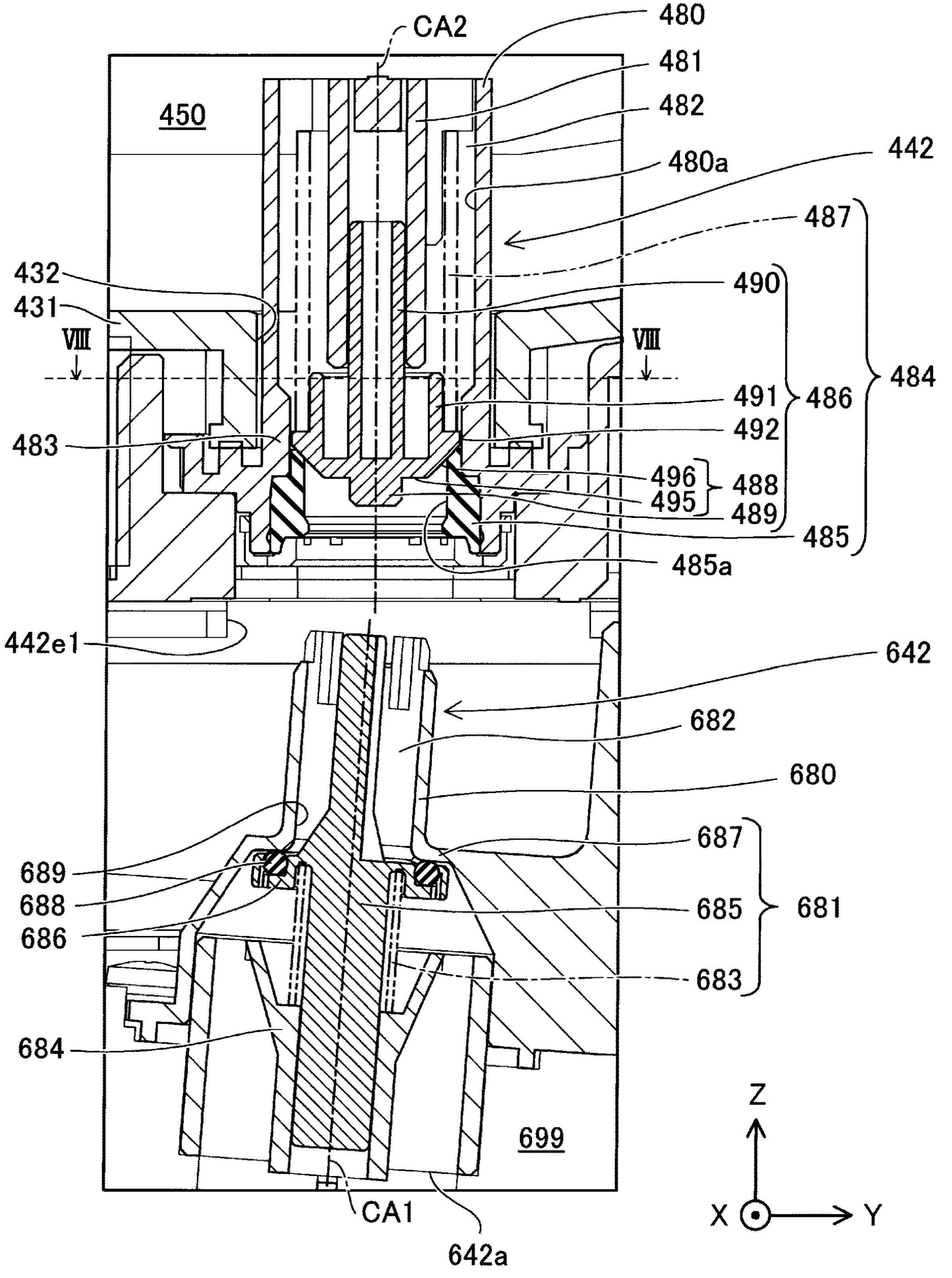
FIG. 6 is an enlarged sectional view of the liquid supply portion in the unmounted state.
Figure 7:
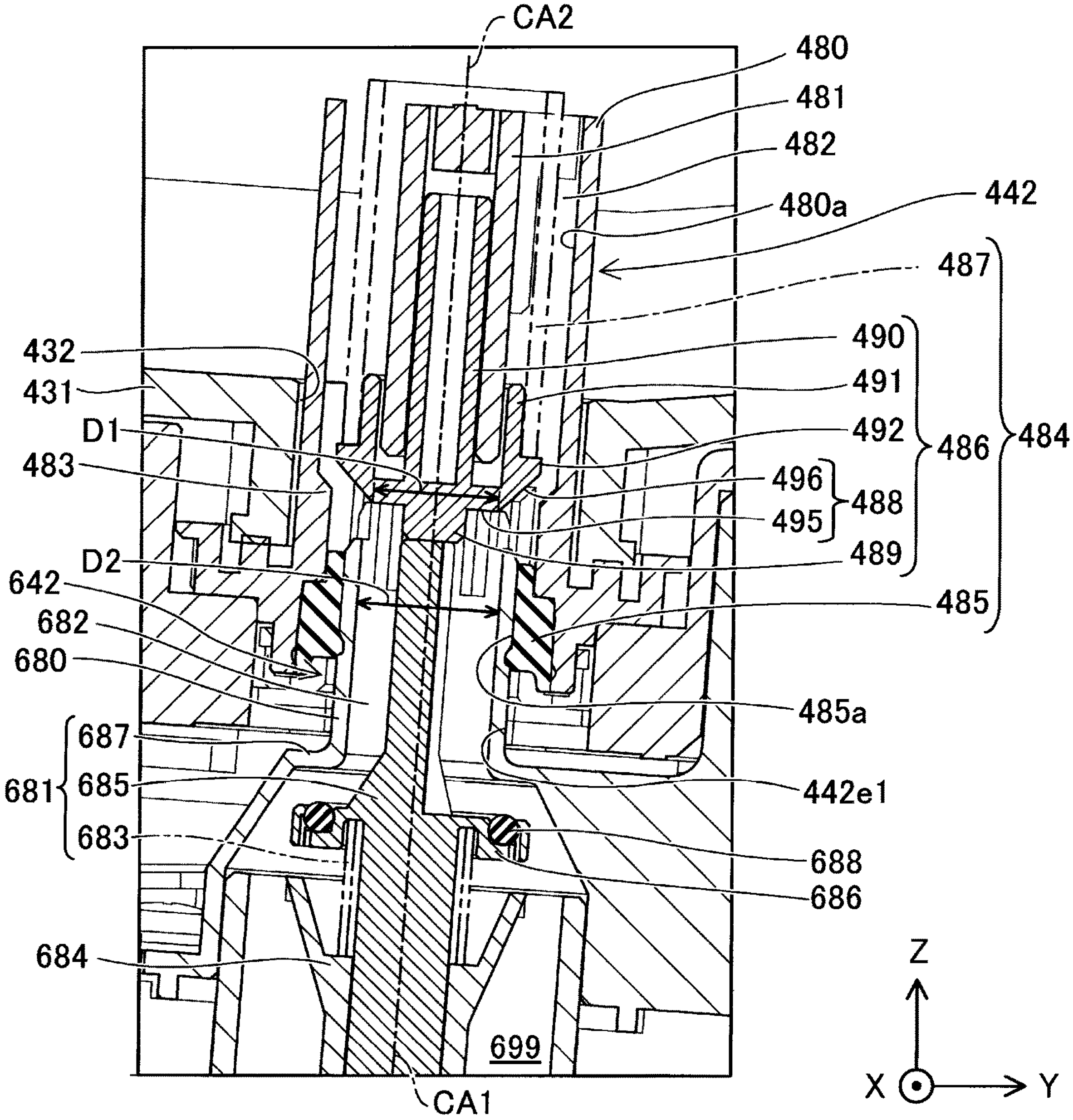
FIG. 7 is an enlarged sectional view of the liquid supply portion in the mounted state.
Figure 8:
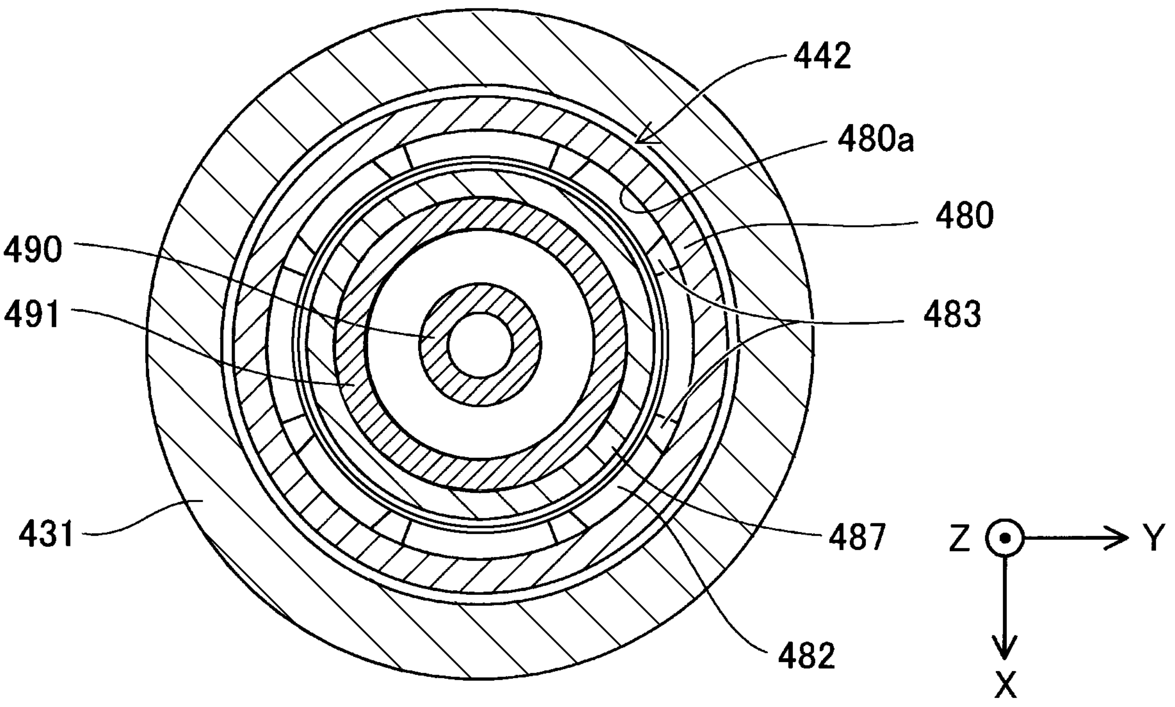
FIG. 8 is a sectional view taken along line VIII-VIII in FIG. 6.

FIG. 5 is a perspective view illustrating a partial section of the liquid supply portion 442 and the liquid introduction portion 642 in an unmounted state. FIG. 6 is an enlarged sectional view of the liquid supply portion 442 and the liquid introduction portion 642 in the unmounted state, before the cartridge 4 is rotatably moved after being inserted into the accommodating chamber 61. FIG. 7 is an enlarged sectional view of the liquid supply portion 442 and the liquid introduction portion 642 in the mounted state. FIGS. 6 and 7 are sectional views taken along a YZ plane, as a cutting plane, that passes through the central axis CA1 and the central axis CA2. FIG. 8 is a sectional view taken along line VIII-VIII in FIG. 6.

As illustrated in FIG. 6, the liquid supply portion 442 has a supply portion flow path 482 communicating with the liquid accommodating portion 450. As illustrated in FIG. 5, the liquid supply portion 442 is inserted through an inflow opening portion 432 that is formed in an accommodating body bottom wall 431 which is a bottom wall of the liquid accommodating portion 450. The liquid supply portion 442 has a substantially cylindrical shape with the central axis CA2. The liquid supply portion 442 has a housing 480, a guide portion 481, and a rib 483. The housing 480 has a cylindrical shape. A plurality of slits 441 extending in an axial direction along the central axis CA2 are formed in a part of the housing 480 accommodated in the liquid accommodating portion 450 at intervals in a circumferential direction of the housing 480. The liquid in the liquid accommodating portion 450 flows into the supply portion flow path 482 via the slits 441.

An inner wall 480*a* forming the supply portion flow path 482 is formed with the rib 483 that protrudes inwardly from the inner wall 480*a* and extends in the axial direction along the central axis CA2. The rib 483 is formed on an end portion of the inner wall 480*a* in the axial direction along the central axis CA2. As illustrated in FIG. 8, in the present embodiment, eight ribs 483 are formed at intervals in the circumferential direction of the housing 480. As illustrated in FIG. 6, an outermost wall 492 of a cartridge-side valve body 486 to be described later and the rib 483 overlap each other in the unmounted state, in side view in a direction orthogonal to the central axis CA2. In other words, the rib 483 and the outermost wall 492 are arranged within the same positional range in the axial direction along the central axis CA2. As a result, the cartridge-side valve body 486 can be prevented from oscillating due to impact, thereby preventing leakage of the liquid, which will be described later. On the other hand, as illustrated in FIG. 7, the outermost wall 492 of the cartridge-side valve body 486 and the rib 483 do not overlap each other in the mounted state, in side view. In other words, the rib 483 and the outermost wall 492 are arranged within different positional ranges in the axial direction along the central axis CA2. Thus, it is possible to secure a sectional area of the supply portion flow path 482.

As illustrated in FIG. 5, the guide portion 481 is located inwardly from the inner wall 480*a*, and extends in the axial direction along the central axis CA2. The guide portion 481 guides a movement of the cartridge-side valve body 486 in the axial direction. The guide portion 481 and the housing 480 are coupled to each other at an end portion of the liquid accommodating portion 450 side in the axial direction.

As illustrated in FIG. 6, the liquid supply portion 442 includes a cartridge-side valve mechanism 484 in the supply portion flow path 482 as a valve mechanism. The cartridge-side valve mechanism 484 is closed in the unmounted state to bring the supply portion flow path 482 into a non-communication state, and opened in the mounted state to bring the supply portion flow path 482 into a communication state. The cartridge-side valve mechanism 484 has a cartridge-side valve seat 485 as a valve seat, the cartridge-side valve body 486 as a valve body, and a cartridge-side biasing member 487 as a biasing member.

The cartridge-side valve seat 485 is arranged in the vicinity of a supply opening 442*e*1. The cartridge-side valve seat 485 is an annular member. The cartridge-side valve seat 485 is formed of, for example, an elastic member such as a synthetic rubber or elastomer. An outer peripheral surface of the cartridge-side valve seat 485 is airtightly attached to an inner peripheral surface of the liquid supply portion 442. The cartridge-side valve seat 485 is formed with an insertion port 485*a* penetrating therethrough in a direction along the central axis CA2. Upon the mounting, the liquid introduction portion 642 is inserted into the insertion port 485*a*.

The cartridge-side valve body 486 is slidably attached to the liquid supply portion 442 in the axial direction along the central axis CA2. As illustrated in FIG. 5, the cartridge-side valve body 486 is a rod-shaped member extending in the direction along the central axis CA2. The cartridge-side valve body 486 is located upstream of the cartridge-side valve seat 485 in a circulating direction of the liquid in the supply flow path when the liquid is supplied. As illustrated in FIG. 6, the cartridge-side valve body 486 has a closing surface 488, a protrusion 489, an alignment portion 490, a cylindrical portion 491, and the outermost wall 492.

The closing surface 488 is located at a tip of the cartridge-side valve body 486. The closing surface 488 has a circular shape when viewed in the axial direction along the central axis CA2. The closing surface 488 abuts on the cartridge-side valve seat 485 to close the insertion port 485*a*. The cartridge-side valve body 486 has a flat surface portion 495 and an inclined surface portion 496 formed around the flat surface portion 495. The flat surface portion 495 has a circular shape when viewed in the axial direction along the central axis CA2. The inclined surface portion 496 has an annular shape when viewed in the axial direction along the central axis CA2. As the inclined surface portion 496 gets close to an edge of the closing surface 488, the inclined surface portion 496 is inclined to be located upstream in the liquid circulating direction. In the present embodiment, in the inserted state in which the cartridge 4 is inserted into the cartridge mounting portion 6 or in the mounted state, the liquid supply portion 442 is located in the antigravity direction as the inclined surface portion 496 is directed upstream in the liquid circulating direction. In other words, the inclined surface portion 496 is inclined to be located above the liquid supply portion 442 as it gets close to the edge of the closing surface 488 in the inserted state or the mounted state. As illustrated in FIG. 7, at least a part of the inclined surface portion 496 faces an introduction portion flow path 682 in the axial direction along the central axis CA2 in the mounted state. Therefore, it is possible to smoothly perform gas-liquid exchange during supply of the liquid, which will be described later.

As illustrated in FIG. 6, the protrusion 489 protruding toward the supply opening 442*e*1 is formed at the center of the closing surface 488. The protrusion 489 has a columnar shape. The protrusion 489 is arranged at a position where the central axis CA2 passes through. The protrusion 489 is located in an insertion port 485*a* of the cartridge-side valve seat 485 in a state in which the cartridge-side valve mechanism 484 is closed. As illustrated in FIG. 7, the protrusion 489 of the cartridge-side valve body 486 is opened by pushing the apparatus-side valve body 685 arranged in the liquid introduction portion 642 in the mounted state. The cylindrical portion 491 has a cylindrical shape, and is formed around the alignment portion 490. In the mounted state, a tip of the guide portion 481 enters a space between the alignment portion 490 and the cylindrical portion 491. The outermost wall 492 is a part extending in the axial direction along the central axis CA2 from the edge of the closing surface 488. The outermost wall 492 is located at an outermost position in a direction orthogonal to the axial direction along the central axis CA2. The alignment portion 490 has a cylindrical shape extending along the axial direction along the central axis CA2. The alignment portion 490 is located inside the guide portion 481. Movement of the cartridge-side valve body 486 in the direction orthogonal to the axial direction along the central axis CA2 is restricted by engaging the alignment portion 490 with the guide portion 481.

The cartridge-side biasing member 487 biases the cartridge-side valve body 486 in a direction toward the cartridge-side valve seat 485. The cartridge-side biasing member 487 is, for example, a helical compression spring. One end of the cartridge-side biasing member 487 abuts against the cartridge-side valve body 486, and the other end thereof abuts against the liquid supply portion 442.

A space between the inner wall 480*a* and the cartridge-side valve seat 485 and a space between the guide portion 481 and the cartridge-side valve body 486 are the supply portion flow path 482.

The liquid introduction portion 642 is coupled to the liquid supply portion 442 and receives the liquid from the liquid supply portion 442 in the mounted state of the cartridge 4. The liquid introduction portion 642 has the introduction portion flow path 682 for allowing the liquid supplied from the liquid supply portion 442 to circulate therein. As illustrated in FIG. 6, the liquid introduction portion 642 has the central axis CA1. The central axis CA1 is inclined relative to the gravity direction.

The liquid introduction portion 642 includes an introduction portion main body 680 and an apparatus-side valve mechanism 681. The introduction portion main body 680 is hollow, and a tip part thereof has a cylindrical shape. The introduction portion main body 680 has the introduction portion flow path 682 formed therein.

The apparatus-side valve mechanism 681 is located in the introduction portion flow path 682, and opens/closes the introduction portion flow path 682. The apparatus-side valve mechanism 681 has an apparatus-side valve seat 687, an apparatus-side valve body 685, and an apparatus-side biasing member 683 formed by the introduction portion main body 680. The apparatus-side valve seat 687 is a part of the introduction portion main body 680 extending in a direction orthogonal to the central axis CA1. The apparatus-side valve seat 687 has an apparatus-side valve hole 689 which is a part of the introduction portion flow path 682.

The apparatus-side valve body 685 is a rod-shaped member extending in the direction along the central axis CA1. The apparatus-side valve body 685 is located in the introduction portion flow path 682, and opens/closes the introduction portion flow path 682. The apparatus-side valve body 685 is formed with an arrangement portion 686. The arrangement portion 686 is a part of the apparatus-side valve body 685 whose size in the direction orthogonal to the central axis CA1 is larger than the other part. The arrangement portion 686 faces the apparatus-side valve seat 687. A sealing member 688, which is an annular elastic member, is attached to the arrangement portion 686. The sealing member 688 is formed of an elastomer or a rubber. The sealing member 688 airtightly abuts against the apparatus-side valve seat 687 in a state in which the liquid introduction portion 642 and the liquid supply portion 442 are not coupled to each other, and thus the apparatus-side valve hole 689 of the apparatus-side valve seat 687 is closed by the apparatus-side valve body 685. As a result, the apparatus-side valve body 685 is closed.

The apparatus-side biasing member 683 biases the apparatus-side valve body 685 in a direction toward the apparatus-side valve seat 687. The apparatus-side biasing member 683 is, for example, a helical compression spring. One end of the apparatus-side biasing member 683 abuts against the arrangement portion 686, and the other end thereof abuts against a pedestal 684. The pedestal 684 is a member forming the base end 642*a* of the liquid introduction portion 642, and mounted on the introduction portion main body 680.

As illustrated in FIG. 7, when the cartridge 4 is mounted, the cartridge-side valve mechanism 484 is opened by the cartridge-side valve body 486 being pushed by the liquid introduction portion 642 and being separated from the cartridge-side valve seat 485. Meanwhile, when the cartridge 4 is mounted, the apparatus-side valve body 685 is opened by being separated from the apparatus-side valve seat 687 of the introduction portion main body 680. The supply portion flow path 482 and the introduction portion flow path 682 are then coupled to each other. In the mounted state, the liquid accommodated in the liquid accommodating portion 450 flows into the supply portion flow path 482 through the slit 441. The liquid flows from the supply portion flow path 482 into the introduction portion flow path 682, and is supplied to the liquid storage portion 699.

As described above, in the present embodiment, the ink is supplied from the liquid supply portion 442 to the liquid introduction portion 642 through the supply portion flow path 482 and the introduction portion flow path 682. Meanwhile, air accommodated in the liquid storage portion 699 forms bubbles, and the bubbles flow into the liquid accommodating portion 450 through the introduction portion flow path 682 and the supply portion flow path 482. As a result, gas-liquid exchange in the liquid accommodating portion 450 is performed. The cartridge 4 is mounted in the printing apparatus 10 in a direction in which the liquid circulating direction is substantially the gravity direction and in a mounted posture in which the supply portion flow path 482 of the cartridge 4 is placed on the introduction portion flow path 682. The cartridge 4 in the present embodiment is derived to smoothly perform gas-liquid exchange, as will be described later.

As illustrated in FIG. 7, at least a part of the inclined surface portion 496 faces the introduction portion flow path 682 in the axial direction along the central axis CA2 in the mounted state. Therefore, the gas-liquid exchange can be performed smoothly. The inventors of the present disclosure have found a problem in that when a part facing the introduction portion flow path 682 of a supply portion flow path forming surface on which the supply portion flow path 482 is formed extends in a horizontal direction, the bubbles stay in the part extending in the horizontal direction, and the gas-liquid exchange is not performed smoothly. The inventors of the present disclosure have also found that at least the part facing the introduction portion flow path 682 of the supply portion flow path forming surface on which the introduction portion flow path 682 is formed is inclined relative to the horizontal direction, and the bubbles can move upward along the inclined surface due to a buoyant force, thereby solving the problem. In the present embodiment, the cartridge-side valve body 486 has a configuration in which at least a part of the inclined surface portion 496 faces the introduction portion flow path 682 in the mounted state. Specifically, an inner diameter D1 of the inclined surface portion 496 is smaller than an outer diameter D2 of the introduction portion flow path 682. Here, the inner diameter D1 of the inclined surface portion 496 is a diameter of a circle at a boundary between the flat surface portion 495 and the inclined surface portion 496. In the mounted state, the central axis CA1 of the liquid introduction portion 642 is substantially collinear with the central axis CA2 of the liquid supply portion 442. Therefore, with the configuration in which the inner diameter D1 is smaller than the outer diameter D2, a configuration is realized in which the inclined surface portion 496 of the closing surface 488 from the part facing the introduction portion flow path 682 to the edge of the closing surface 488 is formed. In the mounted state, the inclined surface portion 496 is provided on the closing surface 488 facing the introduction portion flow path 682, so that the rising bubbles move smoothly to the edge of the closing surface 488 along the inclined surface portion 496. The bubbles reached the edge of the closing surface 488 raise the supply portion flow path 482 and flow into the liquid accommodating portion 450. As such, the gas-liquid exchange can be performed smoothly, and thus a supply speed of the liquid is stabilized. The flat surface portion 495 and the protrusion 489 are provided at the closing surface 488, so that when the liquid supply portion 442 and the liquid introduction portion 642 are coupled to each other, the cartridge-side valve body 486 can evenly receive a pushing force by the apparatus-side valve body 685 along the central axis CA2.

The alignment portion 490 is formed at a position separated from the inner wall 480*a* forming the supply portion flow path 482. As a result, the supply portion flow path 482 can be formed across the circumferential direction of the liquid supply portion 442 as illustrated in FIG. 8. Thus, it is possible to secure a sectional area of the supply portion flow path 482, and smoothly perform the gas-liquid exchange. Generally, when one flow path has a small sectional area, it is difficult to smoothly exchange gas and the liquid, and when one flow path has a large sectional area, it is easy to smoothly exchange gas and the liquid. When the flow path has a large sectional area, it is possible to sufficiently secure the flow path of the bubbles because circulations of the bubbles and the liquid are easily performed. For example, when the flow path is divided into a plurality by partitioning walls, a total sectional area of the flow path is large, but the separate sectional area of the flow path is small. Thus, it is difficult to perform smooth gas-liquid exchange. Further, as a configuration of the alignment portion different from that in the present embodiment, a configuration is considered in which the housing 480 functions as a guide portion and in which an alignment portion engaging with the inner wall 480*a* of the housing 480 is provided with the cartridge-side valve body 486. However, in a case of the configuration, the movement of the cartridge-side valve body 486 in the direction orthogonal to the axial direction is restricted. Therefore, the larger the area in which the inner wall 480*a* of the housing 480 engages with the outer peripheral surface of the alignment portion, the smaller the sectional area of the supply portion flow path 482 whose outer periphery is the inner wall 480*a* of the housing 480. In the present embodiment, the alignment portion 490 is formed at a position separated from the inner wall 480*a* forming the supply portion flow path 482, and the guide portion 481 engaging with the alignment portion 490 is provided inside the housing 480. As a result, the supply portion flow path 482 can be formed between the inner wall 480*a* of the housing 480 and an outer wall of the guide portion 481. Thus, the supply portion flow path 482 can be formed across the circumferential direction of the liquid supply portion 442. It is possible to secure a sectional area of the supply portion flow path 482, and smoothly perform the gas-liquid exchange.

As illustrated in FIG. 6, an outermost wall 492 of a cartridge-side valve body 486 and the rib 483 overlap each other in the unmounted state, when viewed from the direction orthogonal to the central axis CA2. As a result, the cartridge-side valve body 486 can be prevented from oscillating due to impact, thereby preventing leakage of the liquid. A single cartridge 4 is not mounted in the printing apparatus 10, which may receive impact due to falling. In this case, when a gap between the cartridge-side valve body 486 and the housing 480 is large, the cartridge-side valve body 486 is oscillated to temporarily release an airtight state with the cartridge-side valve seat 485, which may result in leakage of the liquid in the liquid supply portion 442 to the outside. In the present embodiment, the rib 483 is formed to fill the gap between the cartridge-side valve body 486 and the housing 480. As a result, since the gap between the outermost wall 492 of the cartridge-side valve body 486 and the rib 483 is small, the movement of the cartridge-side valve body 486 in the direction orthogonal to the axial direction is limited. Thus, the cartridge-side valve body 486 can be prevented from oscillating due to impact, thereby preventing leakage of the liquid. On the other hand, as illustrated in FIG. 7, the outermost wall 492 of the cartridge-side valve body 486 and the rib 483 do not overlap each other in the mounted state, in side view. Specifically, the rib 483 is located downstream of the outermost wall 492 in the circulating direction in the mounted state. Therefore, it is possible to secure an enough space between the rib 483 and the outermost wall 492 and secure the sectional area of the supply portion flow path 482, in the mounted state.

According to the above embodiment, the closing surface 488 of the cartridge-side valve body 486 has the flat surface portion 495 and the inclined surface portion 496. As the inclined surface portion 496 gets close to the edge of the closing surface 488, the inclined surface portion 496 is inclined to be located upstream in the circulating direction. At least a part of the inclined surface portion 496 faces the introduction portion flow path 682 in the mounted state. As a result, the bubbles can move upward along the inclined surface portion 496 in supplying the liquid, so that the gas-liquid exchange can be smoothly performed. According to the above embodiment, the inner diameter D1 of the inclined surface portion 496 is smaller than the outer diameter D2 of the introduction portion flow path 682. A configuration can be realized in which at least a part of the inclined surface portion 496 faces the introduction portion flow path 682 in the mounted state.

According to the above embodiment, the liquid supply portion 442 has the guide portion 481 located inwardly from the inner wall 480*a*, and extends in the axial direction along the central axis CA2. The cartridge-side valve body 486 has the alignment portion 490 extending in the axial direction and restricting the movement of the cartridge-side valve body 486 in the direction orthogonal to the axial direction by the guide portion 481. As a result, the supply portion flow path 482 can be formed between the inner wall 480*a* and the guide portion 481. Thus, it is possible to secure a sectional area of the supply portion flow path 482, and smoothly perform the gas-liquid exchange.

According to the above embodiment, the supply portion flow path 482 is located between the inner wall 480*a* and the guide portion 481, and formed across the circumferential direction of the liquid supply portion 442. As a result, it is possible to secure a sectional area of the supply portion flow path 482, and smoothly perform the gas-liquid exchange.

According to the above embodiment, at least a part of the outermost wall 492 of the cartridge-side valve body 486 and the rib 483 overlap each other in the unmounted state, and the outermost wall 492 and the rib 483 do not overlap each other in the mounted state, in side view in the direction orthogonal to the central axis CA2. As a result, the cartridge-side valve body 486 can be prevented from oscillating due to impact in the unmounted state, thereby preventing leakage of the liquid. On the other hand, it is possible to secure an enough space between the rib 483 and the outermost wall 492 and secure the sectional area of the supply portion flow path 482, in the mounted state.

B. Other Embodiments

B-1. Other Embodiment 1

In the above embodiment, the entire region of the outermost wall 492 of the cartridge-side valve body 486 and the rib 483 overlap each other in the unmounted state, in side view. In other embodiments, a part of the outermost wall 492 and the rib 483 may be an overlapped form in side view. At least a part of the outermost wall 492 can prevent the cartridge-side valve body 486 from oscillating due to the overlapping with the rib 483.

B-2. Other Embodiment 2

The present disclosure is not limited to an ink jet printer and an ink cartridge thereof, but can be applied to any printing apparatus that ejects other liquids except for ink and a cartridge thereof. For example, various printing apparatuses and cartridges thereof can be applied as follows.

(1) Image recording apparatus such as a fax machine (2) Printing apparatus that ejects color materials used in manufacturing a color filter for an image display apparatus such as a liquid crystal display (3) Printing apparatus that ejects electrode materials used in forming electrodes such as an organic electroluminescence (EL) display or field emission display (FED)

(4) Printing apparatus that ejects a liquid including bioorganic matters used in manufacture of a biochip (5) Sample printing apparatus as precision pipette (6) Printing apparatus of lubricating oil (7) Printing apparatus of resin liquid (8) Printing apparatus that ejects lubricating oil to a precision machine, such as a watch and a camera, with a pinpoint (9) Printing apparatus that ejects a transparent resin liquid, such as an ultraviolet curable resin liquid, to a substrate to form a micro-hemispherical lens (optical lens) used for an optical communication element or the like

(10) Printing apparatus that ejects an acidic or alkaline etching solution to etch a substrate or the like

(11) Printing apparatus including a liquid ejecting head that discharges any other minute amount of liquid droplets The "liquid droplets" refers to a state of the liquid discharged from the printing apparatus, and includes those having particle-like, tear-like, or thread-like trails. In addition, the "liquid" here may be any material that can be ejected by the printing apparatus. For example, the "liquid" may be a material in a state where the substance is in a liquid phase, and liquid materials with high or low viscosity and liquid materials such as sol, gel water, other inorganic solvents, organic solvents, solutions, liquid resins, and liquid metal are also included in the "liquid". In addition, the "liquid" includes not only a liquid as one state of a substance but also a "liquid" obtained by dissolving, dispersing or mixing particles of a functional material made of a solid such as a pigment or metal particles in a solvent. In addition, representative examples of the liquid include ink and liquid crystal as described in the above embodiment. Here, the ink includes various liquid compositions such as normal water-based ink and oil-based ink, gel ink, and hot-melt ink.

C. Other Aspects

The present disclosure is not limited to the above-described embodiment, and can be realized with various configurations without departing from the spirit of the present disclosure. For example, the technical features of the embodiments corresponding to the technical features in each embodiment described below can be appropriately replaced or combined to solve some or all of the above-described problems, or to achieve some or all of the above effects. In addition, when the technical feature is not described as essential in the present specification, it can be deleted as appropriate. In addition, when the technical feature is not described as essential in the present specification, it can be appropriately deleted.

(1) According to a first aspect of the present disclosure, there is provided a cartridge that is detachably mounted in a liquid ejecting apparatus including a liquid introduction portion with an introduction portion flow path. The cartridge includes: a liquid accommodating portion for accommodating a liquid; a liquid supply portion having a central axis and having a supply portion flow path which communicates with the liquid accommodating portion; and a valve mechanism arranged in the supply portion flow path, closed in an unmounted state in which the cartridge is not mounted in the liquid ejecting apparatus to bring the supply portion flow path into a non-communication state, and opened in a mounted state in which the cartridge is mounted in the liquid ejecting apparatus to bring the supply portion flow path into a communication state. The valve mechanism has a valve seat having an insertion port into which the liquid introduction portion is inserted, a valve body having a closing surface which abuts on the valve seat to close the insertion port and located upstream of the valve seat in a circulating direction of the liquid in the supply portion flow path when the liquid is supplied, and a biasing member biasing the valve body toward the valve seat. The valve mechanism is opened by the valve body being pushed by the liquid introduction portion and being separated from the valve seat. The closing surface has a flat surface portion, and an inclined surface portion formed around the flat surface portion and inclined toward an edge of the closing surface so that the edge is located upstream in the circulating direction, and at least a part of the inclined surface portion faces the introduction portion flow path in the mounted state. According to the aspect, bubbles can move upward along the inclined surface portion in supplying the liquid to the liquid ejecting apparatus, so that the gas-liquid exchange can be smoothly performed.

(2) In the aspect, the liquid supply portion may have an inner wall forming the supply portion flow path and has a guide portion located inwardly from the inner wall, extending in an axial direction along the central axis, and guiding movement of the valve body, and the valve body may have an alignment portion which extends in the axial direction and the movement of which in a direction orthogonal to the axial direction is restricted by the guide portion. According to the aspect, the supply portion flow path can be formed between the inner wall and the guide portion. Thus, it is possible to secure a sectional area of the supply portion flow path, and smoothly perform the gas-liquid exchange.

(3) In the aspect, the supply portion flow path may be located between the inner wall and the guide portion and formed across a circumferential direction of the liquid supply portion. According to the aspect, it is possible to secure a sectional area of the supply portion flow path, and smoothly perform the gas-liquid exchange.

(4) In the aspect, the valve body may have an outermost wall located at an outermost position in an orthogonal direction which is orthogonal to the axial direction along the central axis and extending in the axial direction, the liquid supply portion may have a rib which protrudes inward from the inner wall forming the supply portion flow path and extends in the axial direction, and at least a part of the outermost wall and the rib may overlap each other in the unmounted state and the outermost wall and the rib may not overlap each other in the mounted state, in side view in the orthogonal direction. According to the aspect, the valve body can be prevented from oscillating due to impact in the unmounted state, thereby preventing leakage of the liquid. On the other hand, it is possible to secure an enough space between the rib and the outermost wall and secure the sectional area of the supply portion flow path, in the mounted state.

(5) In the aspect, an inner diameter of the inclined surface portion may be smaller than an outer diameter of the introduction portion flow path. According to the aspect, a configuration can be realized in which at least a part of the inclined surface portion faces the introduction portion flow path in the mounted state.

In addition to the aspect described above, the present disclosure can be realized as an aspect such as a method of manufacturing a cartridge, a valve mechanism of the cartridge, or the like.

What is claimed is:

1. A cartridge that is detachably mounted in a liquid ejecting apparatus including a liquid introduction portion with an introduction portion flow path, comprising:

a liquid accommodating portion for accommodating a liquid;

a liquid supply portion having a central axis and having a supply portion flow path which communicates with the liquid accommodating portion; and a valve mechanism arranged in the supply portion flow path, closed in an unmounted state in which the cartridge is not mounted in the liquid ejecting apparatus to bring the supply portion flow path into a non-communication state, and opened in a mounted state in which the cartridge is mounted in the liquid ejecting apparatus to bring the supply portion flow path into a communication state, wherein the valve mechanism has a valve seat having an insertion port into which the liquid introduction portion is inserted, a valve body having a closing surface which abuts on the valve seat to close the insertion port and located upstream of the valve seat in a circulating direction of the liquid in the supply portion flow path when the liquid is supplied, and a biasing member biasing the valve body toward the valve seat, the valve mechanism is opened by the valve body being pushed by the liquid introduction portion and being separated from the valve seat, the closing surface has a flat surface portion, and an inclined surface portion formed around the flat surface portion and inclined toward an edge of the closing surface so that the edge is located upstream of the valve seat in the circulating direction, and at least a part of the inclined surface portion faces the introduction portion flow path in the mounted state, and the inclined surface portion abuts on the valve seat when the liquid is not supplied.

2. The cartridge according to claim 1, wherein the liquid supply portion has an inner wall forming the supply portion flow path and has a guide portion located inwardly from the inner wall, extending in an axial direction along the central axis, and guiding movement of the valve body, and the valve body has an alignment portion which extends in the axial direction and movement of which in a direction orthogonal to the axial direction is restricted by the guide portion.

3. The cartridge according to claim 2, wherein the supply portion flow path is located between the inner wall and the guide portion and formed across a circumferential direction of the liquid supply portion.

4. The cartridge according to claim 1, wherein the valve body has an outermost wall located at an outermost position in an orthogonal direction which is orthogonal to the axial direction along the central axis and extending in the axial direction, the liquid supply portion has a rib which protrudes inward from an inner wall forming the supply portion flow path and extends in the axial direction, and at least a part of the outermost wall and the rib overlap each other in the unmounted state and the outermost wall and the rib do not overlap each other in the mounted state, in side view in the orthogonal direction.

5. The cartridge according to claim 1, wherein an inner diameter of the inclined surface portion is smaller than an outer diameter of the introduction portion flow path.

* * * * *